Oct. 19, 1965 JIRO OKUDA 3,213,294

SIGNAL LEVEL DISCRIMINATOR CIRCUIT WITH ZENER DIODE INTERROGATED BY BIPOLAR PULSES AND BIASED BY TERNARY INPUT

Filed Jan. 16, 1962 3 Sheets-Sheet 1

INVENTOR.
JIRO OKUDA
BY Ray C. Hapgood
ATTORNEY

Oct. 19, 1965 JIRO OKUDA 3,213,294

SIGNAL LEVEL DISCRIMINATOR CIRCUIT WITH ZENER DIODE INTERROGATED BY BIPOLAR PULSES AND BIASED BY TERNARY INPUT

Filed Jan. 16, 1962 3 Sheets-Sheet 2

INVENTOR.
JIRO OKUDA
BY Roy C. Hapgood
ATTORNEY

INVENTOR.
JIRO OKUDA
BY Ray C. Hopgood
ATTORNEY 3,213,294

SIGNAL LEVEL DISCRIMINATOR CIRCUIT WITH ZENER DIODE INTERROGATED BY BIPOLAR PULSES AND BIASED BY TERNARY INPUT

Jiro Okuda, Tokyo, Japan, assignor to Nippon Electric Company Limited, Tokyo, Japan, a corporation of Japan Filed Jan. 16, 1962, Ser. No. 166,517
Claims priority, application Japan, Jan. 16, 1961, 36/1,249
6 Claims. (Cl. 307—88.5)

This invention relates to a ternary to binary translator circuit which is operable to transform a three level signal into a pair of two level signals. The invention is useful in telephone systems, digital computer systems, and other electronic systems in which ternary signals are employed. The invention is characterized by the use of a Zener diode to discriminate between three different voltage or current levels on a ternary input conductor, and by a pulse generator which is adapted to sample the state of the Zener diode and to produce binary output signals representing the ternary input signal.

In electronic switching circuits and digital computer circuits, binary signals are used almost exclusively to represent information because of the simplicity, reliability, and accuracy of bi-level circuits as compared to circuits having three or more levels. In many applications, however, it is more convenient to represent certain input information in ternary form, and it therefore becomes desirable to have a simple ternary to binary translator to transform the ternary signals into binary signals so that they can be used in bi-level switching circuits or computer circuits.

Accordingly, one object of this invention is to provide a simple, reliable, and accurate ternary to binary translator circuit.

Another object of this invention is to provide a simple signal level discriminator for discriminating between three different voltage or current levels.

A further object of this invention is to provide means for sampling the state of the above noted signal level discriminator to produce binary signals representing the state of the discriminator.

Other objects and advantages of the invention will become apparent to those skilled in the art from the following description of several specific embodiments thereof, as illustrated in the attached drawings, in which.

In general terms, this invention comprises a diode signal level discriminator which is adapted to assume one of three distinct conditions in response to an input voltage or current which has a corresponding one of three distinct levels, and a pulse generator which is adapted to sample the state of the signal level discriminator circuit and to produce binary output signals representing the state of the signal level discriminator. The signal level discriminator is adapted to operate the diode near the center or near either end of the cut-off region of its characteristic curve, and the pulse generator applies a positive and a negative interrogation pulse to the diode. If the diode is operating near one end of its cut-off region, it will pass the positive pulse but not the negative pulse. If it is operating near the other end of its cut-off region, it will pass the negative pulse but not the positive pulse. If it is operating near the center of its cut-off region, it will not pass either of the pulses. Therefore, when the diode is interrogated by the pulse generator, it will produce either a positive output pulse or a negative output pulse or no output pulse, depending on the level of the ternary input signal, thereby translating the ternary input information into binary output information.

In one embodiment of the invention, the negative and positive output pulses are applied to a pulse detector circuit which produces pulse outputs of the same polarity on one of two output conductors depending on the polarity of the input pulse. This pulse detector circuit is not essential to the basic invention, but it is preferable in many computer and switching circuits because the numbers 0 through 2, which constitute the base of the ternary number system, require two information bits in the binary number system.

Figure 1:
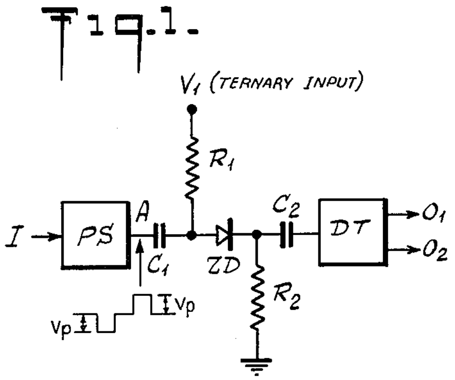
FIG. 1 is a partial schematic circuit diagram of one embodiment of the invention.
Figure 2:
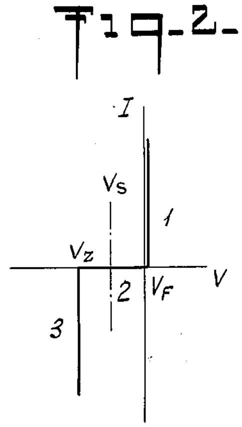
FIG. 2 is the characteristic curve of the Zener diode shown in FIG. 1.

FIG. 1 is a partial schematic diagram of one specific embodiment of the invention which contains a signal level discriminator circuit comprising Zener diode ZD, resistor R1, and resistor R2. The signal level discriminator circuit is coupled to a pulse generator PS via coupling capacitor C1 and to a pulse detector circuit DT via coupling capacitor C2. A ternary voltage level signal $V_1$ is applied to one end of R1, thereby operating the Zener diode near one of three predetermined points on its characteristic curve, which is illustrated in FIG. 2, where $V_z$, $V_s$, and $V_f$ are the three points. Pulse generator PS produces a positive pulse output and a negative pulse output in response to trigger signals applied on input I, as indicated by the waveform in FIG. 1. The amplitude $V_p$ of the output pulses from pulse generator PS is selected to be equal to or smaller than ½ the cut-off voltage range ($V_f$ to $V_z$) on the Zener diode characteristic curve, as explained more fully below. Pulse detector DT produces an output pulse on output $O_1$ in response to negative input pulses and an output pulse on output $O_2$ in response to positive input pulses.

In FIG. 1, assume that $V_1$ is equal to ground potential. In this case, positive pulses from PS will activate DT and corresponding pulses will appear at the terminal $O_2$, while negative pulses will be blocked by the characteristic of the cutoff region of the Zener diode ZD, and there will be no effect at the output terminals of detector circuit DT. As the second step, let us consider the case when the following relation is established between the amplitude $V_p$ of the pulse from pulse generator circuit PS and the Zener voltage $V_z$ of Zener diode ZD:

$$V_p < V_s = \tfrac{1}{2} V_z \quad (1)$$

If $V_1 = -V_s$, neither positive nor negative pulse can activate the pulse detector circuit DT under the condition of the Equation 1.

If $V_1 = -V_z$, negative pulses from point A will pass through the gate, which in turn will produce an output pulse at the output terminal $O_1$ of the detector circuit DT. Positive pulses from point A, however, will be blocked by the cutoff region of the Zener diode, whereby no output pulse will be produced on output $O_2$ of circuit DT.

Figure 3:
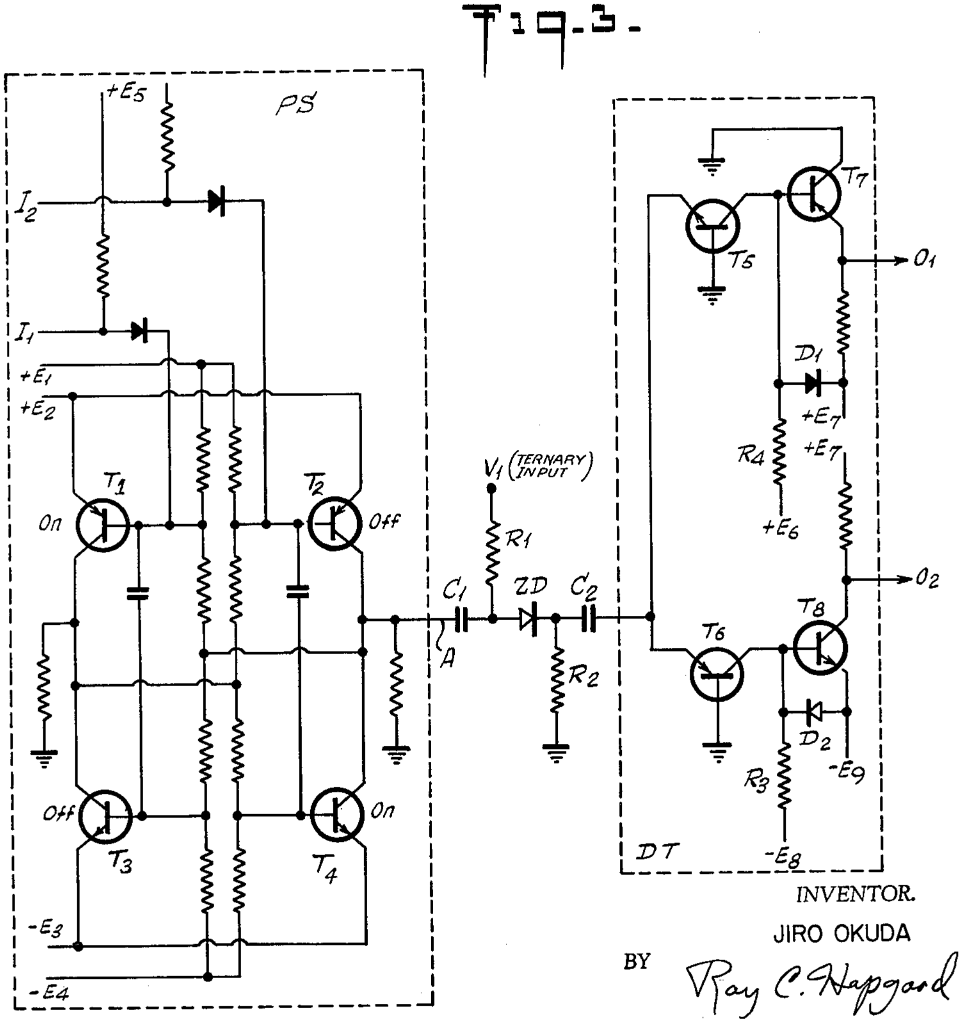
FIG. 3 is a complete schematic circuit diagram of the embodiment shown in FIG. 1.
Figure 4A:
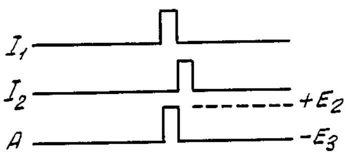
FIG. 4A is a set of waveforms illustrating the operation of the embodiment shown in FIGS. 1 and 3 under one ternary input condition.
Figure 4B:
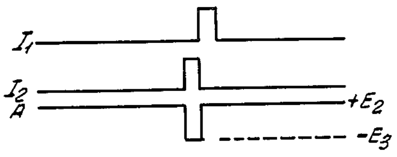
FIG. 4B is a set of waveforms illustrating the operation of the embodiment shown in FIGS. 1 and 3 under a second ternary input condition.

FIG. 3 shows one suitable circuit arrangement for pulse generator PS and pulse detector DT of FIG. 1. The pulse generator circuit contains a complementary pair of output transistors T2 and T4 which are switched on, one at a time, to develop either a positive or a negative output pulse on conductor A. When transistor T2 is switched on, a potential of $+E_2$ is applied to conductor A, and when transistor T4 is switched on, a potential of $-E_3$ is applied to conductor A. Transistors T2 and T4 are cross coupled to complementary transistors T1 and T3 to form a bistable circuit in which either transistor T2 and T3 or T1 and T4 are conductive. A positive pulse applied to input $I_1$ makes transistors T2 and T3 conductive, which applies a potential of $+E_2$ to output conductor A. A positive pulse applied to input $I_2$ makes transistors T1 and T4 conductive, which applies a potential of $-E_3$ to output conductor A. When transistors T2 and T3 are switched on, transistors T1 and T4 are switched off, and vice versa, by means of the cross coupling network, whose operation will be apparent to those skilled in the art. Positive output pulses, which are illustrated in FIG. 4A, are generated by applying an input pulse to input $I_1$ to start the positive going output pulse and then applying an input pulse to input $I_2$ to end the positive going output pulse. The pulse width of the output pulse is determined by the time interval separating the pulse applied to inputs $I_1$ and $I_2$. Negative output pulses, which are illustrated in FIG. 4B, are generated by applying an input pulse first to input $I_2$ and second to input $I_1$. Thus, it can be seen that the particular pulse generator circuit shown in FIG. 3 can be used to generate both positive and negative output pulses to sample the state of Zener diode ZD. It should be understood, however, that this particular circuit is by no means essential to the invention. Any suitable pulse generator circuit can be used, and in some applications of the invention, it may be desirable to use a pulse generator circuit which produces both the positive and the negative output pulse in response to a single input pulse.

In the detector circuit DT, positive pulses cause the transistors $T_6$ and $T_8$ to be conductive, thus sending negative pulses from the terminal $O_2$. For negative pulse input, the transistors $T_5$ and $T_7$ become conductive, sending negative pulses from the terminal $O_1$. Resistor $R_3$ and diode $D_2$, and resistor $R_4$ and diode $D_1$ act as current limiters, as will be readily apparent to those skilled in the art.

Figure 5:
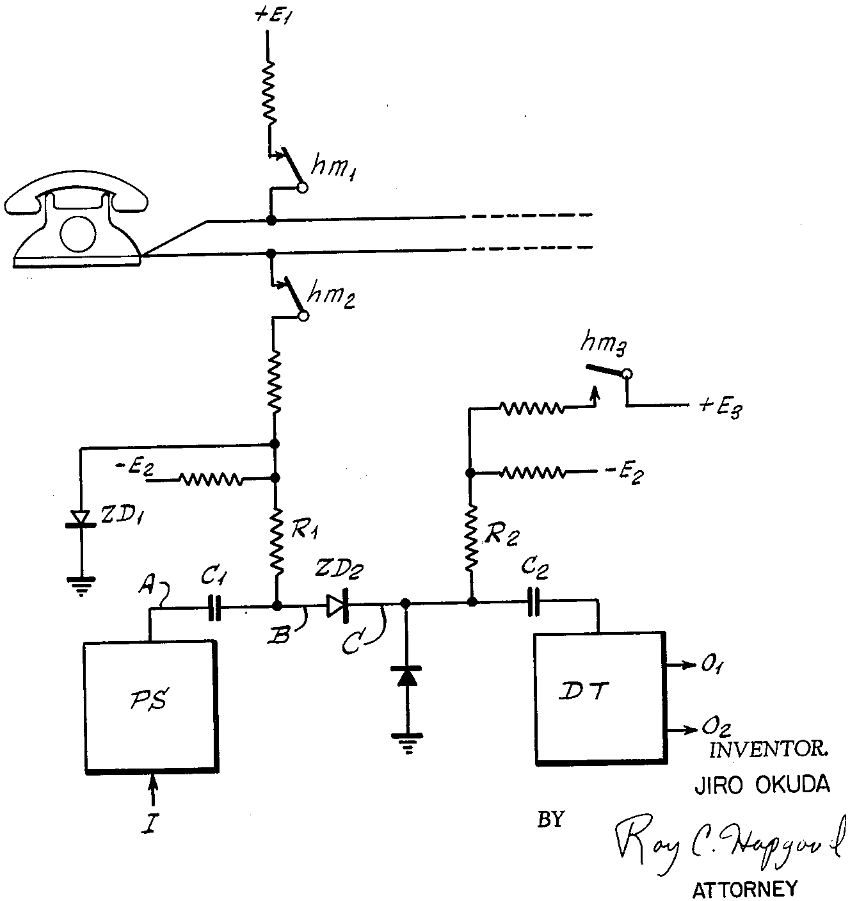
FIG. 5 is a partial schematic circuit diagram showing the embodiment of FIGS. 1 and 3 as used in one illustrative telephone circuit.
Figure 6:
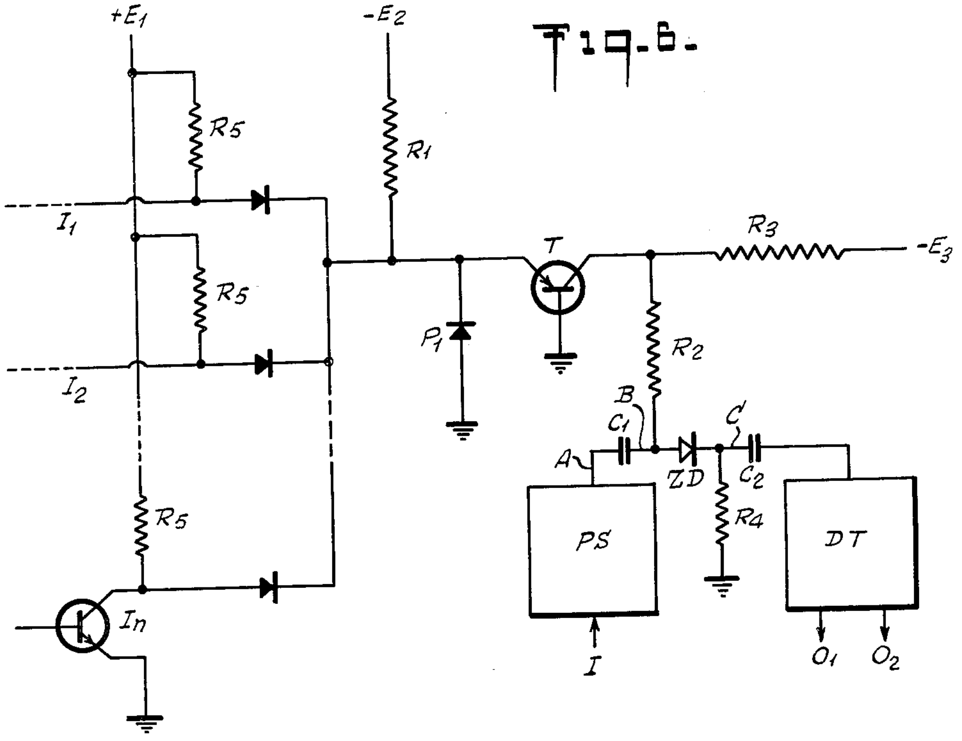
FIG. 6 is a partial schematic circuit diagram showing the embodiment of FIGS. 1 and 3 as used in one illustrative computer circuit.

Examples of the three-value gate circuits of this invention as applied to exemplary electronic equipment are shown in FIGS. 5 and 6.

FIG. 5 is the block diagram of this invention as applied to a subscriber circuit in a telephone switching system. In this diagram, $h_{m1}$—$h_{m3}$ are the off-normal contacts associated with the crossbar switch vertical holding magnet. Contacts $h_{m1}$ and $h_{m2}$ are opened when the holding magnet is energized, while contact $h_{m3}$ is closed when the holding magnet is energized. Also, it is obvious from the diagram that the circuit of this invention comprises resistors $R_1$ and $R_2$, capacitors $C_1$ and $C_2$, and Zener diode $ZD_2$. In FIG. 5, when the subscriber telephone is in the on-hook condition, the potential at the point B is equal to $-V_{Z1}$ under the condition $|E_2|>|V_{Z1}|$, $V_{Z1}$ being the Zener voltage of the Zener diode $ZD_1$. Also, the following relation is assumed among the said Zener voltage $V_{Z1}$, the Zener voltage $V_{Z2}$ of the Zener diode $ZD_2$, and the pulse crest value $V_p$:

$$V_p < V_{Z1} \doteqdot \tfrac{1}{2} V_{Z2} \tag{2}$$

Then, the Zener diode $ZD_2$ being in the cutoff region, neither positive nor negative pulses can pass through the Zener diode $ZD_2$. When the subscriber lifts up the handset, the potential at point B becomes slightly higher than ground by $V_F$ which is the forward voltage drop of the Zener diode $ZD_1$, and the bias voltage of the Zener diode $ZD_2$ becomes slightly above ground by suitably predetermining the values of $E_1$ and $E_2$, and the resistors $R_1$ and $R_2$. In this case, positive pulses from the point A appear at the output terminal $O_2$ of the pulse detector circuit DT through the Zener diode $ZD_2$, while negative pulses from the point A are blocked by the Zener diode $ZD_2$. Subsequently, upon operation of the crossbar switch, thus operating the holding magnet, the potential at the point B returns to $-V_{Z1}$, while the potential at point C becomes:

$$E_3 \doteqdot \tfrac{1}{2} V_{Z2} = V_{Z1} \tag{3}$$

When the voltage is maintained as shown in the above Equation 3, the reverse bias equal to $-V_{Z2}$ is imposed at the Zener diode $ZD_2$, placing the diode within the Zener region or very close to it, whereby negative pulses from the point A can pass through the Zener diode $ZD_2$, while positive pulses are blocked by the Zener diode $ZD_2$. In short, subscriber conditions and responses of the output terminal of the detector circuit DT for positive and negative pulses from the point A are as shown in Table 1.

*Table 1*

| Subscriber condition | Potential at at point B | Potential at point C | Bias voltage at Zener diode $ZD_2$ | Output of detector circuit DT | |
|---|---|---|---|---|---|
| | | | | $O_1$ | $O_2$ |
| Idle | $-V_{Z1} \doteqdot -\tfrac{1}{2}V_{Z2}$ | 0 | $-\tfrac{1}{2}V_{Z2}$ | 0 | 0 |
| Service request | $V_F \doteqdot 0$ | 0 | 0 | 0 | 1 |
| Switch in operation (busy or subscriber lockout). | $-V_{Z1} \doteqdot -\tfrac{1}{2}V_{Z2}$ | $E^3=\tfrac{1}{2}V_{Z2}$ | $-V_{Z2}$ | 1 | 0 |

Thus, the three input voltage levels to Zener diode $ZD_2$, which represent three different conditions of the subscriber telephone, can be discriminated and translated into corresponding binary signals by applying a trigger signal to the input I of pulse generator PS, whose positive and negative pulses produce binary output signals on outputs $O_1$ and $O_2$ of pulse detector DT. In the circuit of FIG. 5, it should be noted that the potential across Zener diode $ZD_2$ is determined by varying potential levels at both the anode (point C) and the cathode (point B) of the Zener diode. It will be understood by those skilled in the art that this produces the same effect as grounding one electrode of the Zener diode and applying a three level voltage to the other electrode, as shown in the circuits of FIG. 1 and FIG. 3.

FIG. 6 shows this invention as applied to a digital-control check circuit for electronic switching systems, electronic computers, and similar equipments. In this example, when *m* out of the *n* inputs $I_1 \ldots I_n$ are the voltages corresponding to the logic "1," the information of the input $I_1 \ldots I_n$ is regarded to be correct. Now, let us consider the case of 2-out-of-*n*, which is regarded as the correct information when two out of *n* informations are the logic "1." In this case, let the relation as shown in the following Equation 4 be established for each of the circuit constants shown in FIG. 6:

$$\frac{E_1}{R_5} = \frac{E_2}{R_1} = \frac{E_3}{2R_3} \tag{4}$$

($E_3$ equal to Zener voltage of the Zener diode ZD.)

When all the inputs $I_1 \ldots I_n$ are the logic "0," or only one of them is the logic "1," the point B is equal to $-E_3$ in potential. In this case, negative pulses from the pulse generator circuit PS are carried to the pulse detector circuit DT through the Zener diode ZD, while positive pulses are blocked by the Zener diode ZD. When two out of the *n* inputs are the logic "1," however, the point B becomes $-\frac{1}{2}E_3$ in potential. In this case, neither positive or negative pulses from the pulse generator circuit PS pass through the Zener diode ZD, thus no pulses reach the detector circuit DT. When three or more of the *n* inputs become the logic "1," the point B becomes ground potential. In this case, positive pulses from the pulse generator circuit PS appear at the pulse detector circuit DT through the Zener diode ZD, while negative pulses are blocked by the Zener diode ZD. In brief, relation between number of the logic "1" in the input and the pulse responses are ass hown in Table 2.

*Table 2*

| Number of logic "1's" | Potential at the point B | Output of detector circuit DT | |
|---|---|---|---|
| | | $O_1$ | $O_2$ |
| 0 | $-E_3$ | 1 | 0 |
| 1 | $-E_3$ | 1 | 0 |
| 2 | $-\frac{1}{2}E_3$ | 0 | 0 |
| 3 or more | 0 | 0 | 1 |

This, the circuit of this invention can also be used to determine whether or not M out of N binary signals are in the binary 1 condition, and to develop binary output signals corresponding to the binary input conditions. It can be seen, then, that this invention is not limited to discriminating three different voltage levels, but rather that it can be used to discriminate any conditions which can be represented by three different voltage or current levels.

Figure 7:
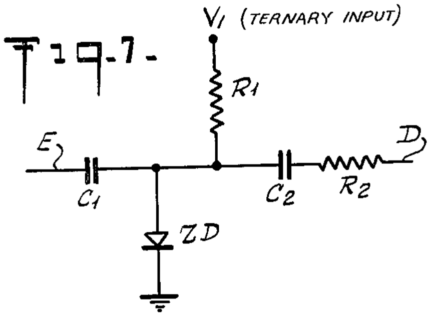
FIG. 7 is a schematic circuit diagram of a second embodiment of this invention.
Figure 8:
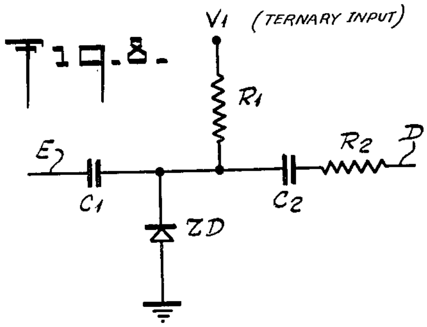
FIG. 8 is a schematic circuit diagram of a third embodiment of this invention.

Although the above described examples show cases in which the Zener diode is connected in series with the sampling pulses applied thereto, the same result can be obtained by parallel-type circuits. Examples of such parallel-type circuits are shown in FIGS. 7 and 8. In FIG. 7, the output at point D in response to positive and negative pulses applied to point E depends on the operating points of the Zener diode ZD, which varies with the potential of control input $V_1$. If the control input $V_1$ is at the ground potential, positive pulses from the input is shunted by the low impedance of the forward characteristic of the Zener diode ZD, and do not appear at the output, while negative pulses appear at the output point. The relation between the control voltage $V_1$ and the output pulses are as shown in Table 3.

*Table 3*

| Voltage of $V_1$ | Output pulses | |
|---|---|---|
| | Positive pulse | Negative pulse |
| 0 | 1 | 0 |
| $-\frac{1}{2}V_Z$ | 1 | 1 |
| $-V_Z$ | 0 | 1 |

In Table 3, $V_Z$ is the Zener voltage of the Zener diode ZD, and referred to in the same manner hereinafter.

For the circuit shown in FIG. 8, the output pulses are as shown in Table 4.

*Table 4*

| Voltage of $V_1$ | Output pulses | |
|---|---|---|
| | Positive pulse | Negative pulse |
| 0 | 1 | 0 |
| $+\frac{1}{2}V_2$ | 1 | 1 |
| $+V_2$ | 0 | 1 |

Figure 9:
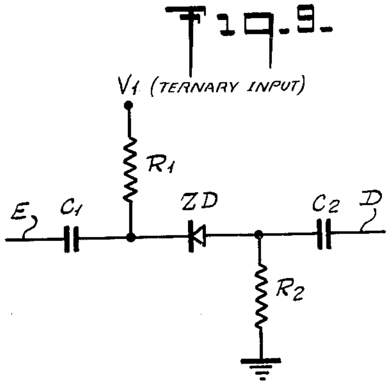
FIG. 9 is a schematic circuit diagram of a fourth embodiment of this invention.

On the other hand, if the gate diode shown in FIG. 1 is reversely connected as shown in FIG. 9, its output-pulse responses are as shown in Table 5.

*Table 5*

| Voltage of $V_1$ | Output pulses | |
|---|---|---|
| | Positive pulse | Negative pulse |
| 0 | 0 | 1 |
| $+\frac{1}{2}V_2$ | 0 | 0 |
| $+V_2$ | 1 | 0 |

From the foregoing description, it will be apparent that this invention provides a simple, reliable, and accurate ternary to binary translator circuit for transforming a three level signal into a pair of two level signals. It will also be apparent that this invention provides a novel telephone switching circuit and a novel computer circuit which utilizes the translator circuit of this invention. And it should be understood that this invention is by no means limited to the particular embodiments disclosed herein by way of example, or the particular examples disclosed herein, since many modifications can be made in the disclosed structure without departing from the basic teaching of this invention. For example, although a Zener diode is preferable in the device of this invention, because of its broad cutoff region and steeply sloped conductive regions, other diodes would also be used if desired; in fact, in some applications of the invention other diodes might be preferable. This and many other modifications of the invention will be apparent to those skilled in the art, and this invention includes all modifications falling within the scope of the following claims.

I claim:

1. A signal level discriminator circuit for discriminating potential conditions of an input signal comprising: means for generating positive and negative interrogation pulses of predetermined amplitude; an output capacitor; a two terminal diode, having a characteristic curve containing positive and negative conducting regions separated by a cutoff region, coupled between said output capacitor and said pulse means; and means, coupled to said diode, for the biasing thereof with said input signal, whereby upon interrogation by said pulses said output capacitor exhibits an output pulse of one polarity for a first range of input voltages and an output pulse of the other polarity for a second range of input voltages and a third output pulse condition for voltages between said first and second ranges.

2. The signal level discriminator circuit as claimed in claim 1 in which the amplitude of said positive and negative pulses is less than one half the cutoff region of said diode.

3. The signal level discriminator circuit as claimed in claim 2 in which said pulse means and said output capacitor are connected to the same terminal of said diode, the other terminal thereof being coupled to ground, and in which said third pulse condition is the presence of both positive and negative pulses.

4. The signal level discriminator circuit as claimed in claim 2 in which said diode is connected in circuit between said pulse means and said output capacitor, and in which said third pulse condition is the absence of both positive and negative pulses.

5. A ternary input to binary output translator comprising the signal level discriminator circuit claimed in claim 4; the two outside values of said ternary input falling within said first and second range of input voltages respectively.

6. The signal level discriminator circuit as claimed in claim 5 further comprising a pulse detector coupled to said output capacitor, said detector having a pair of outputs for the respective indication of plus and minus signals on said capacitor.

(References on following page)

References Cited by the Examiner

"Utilizing Esaki Diode Latches," by Akmenbalms; published in IBM Tech. Disclosure Bulletin, vol. 3, No. 8, January 1961.

"Germanium and Silicon Tunnel Diodes-Design, Operation and Application," in IRE Wescon Convention Record, Part 3, Electron Devices, August 18–21, 1959, pages 20–23.

Scray: "High Speed Saw Tooth Generator," IBM Technical Disclosure Bulletin, vol. 2, No. 6, April 1960, page 111.

ARTHUR GAUSS, *Primary Examiner*.